United States Patent

Cook

[11] Patent Number: 5,847,879
[45] Date of Patent: Dec. 8, 1998

[54] DUAL WAVELENGTH WIDE ANGLE LARGE REFLECTIVE UNOBSCURED SYSTEM

[75] Inventor: Lacy G. Cook, El Segundo, Calif.

[73] Assignee: Raytheon Company, El Segundo, Calif.

[21] Appl. No.: 806,356

[22] Filed: Feb. 26, 1997

[51] Int. Cl.$^6$ ............... G02B 27/14; G02B 17/00; G02B 5/10; G02B 5/08
[52] U.S. Cl. ............... 359/631; 359/365; 359/366; 359/859; 359/861; 359/633; 359/634
[58] Field of Search ............... 359/365, 366, 359/859, 861, 630, 631, 633, 634

[56] References Cited

U.S. PATENT DOCUMENTS

| | | | |
|---|---|---|---|
| 3,841,734 | 10/1974 | Kermode | 359/633 |
| 4,383,740 | 5/1983 | Bordovsky | 359/631 |
| 4,594,509 | 6/1986 | Simon et al. | 359/366 |
| 4,598,981 | 7/1986 | Hallam et al. | 359/366 |
| 4,804,258 | 2/1989 | Kebo | 359/366 |
| 4,861,148 | 8/1989 | Sato et al. | 359/366 |
| 5,170,284 | 12/1992 | Cook | 359/366 |
| 5,173,801 | 12/1992 | Cook | 359/366 |
| 5,309,276 | 5/1994 | Rodgers | 359/366 |
| 5,477,385 | 12/1995 | Freeman | 359/631 |
| 5,497,270 | 3/1996 | Rud | 359/634 |
| 5,515,122 | 5/1996 | Morishima et al. | 359/631 |
| 5,631,770 | 5/1997 | Jarmuz | 359/366 |
| 5,640,283 | 6/1997 | Warren | 359/366 |

Primary Examiner—David C. Nelms
Assistant Examiner—Evelyn A. Lester
Attorney, Agent, or Firm—Leonard A. Alkov; William C. Schubert; Glenn H. Lenzen, Jr.

[57] ABSTRACT

A wide angle large reflective unobscured system includes a primary reflective element for receiving a broad range of energy, a secondary reflective element for reflecting the energy from the primary reflective element to reimage a virtual entrance pupil at a real aperture stop. A beamsplitter element is provided for reflecting a first portion of the energy, such as visible energy, to a first tertiary reflective mirror, while transmitting a second portion of the energy, such as IR light, to a second tertiary reflector. Each tertiary reflector is capable of focusing the received energies to dual focal planes wherein a compact detector array assembly can convert the images to electronic signals.

21 Claims, 2 Drawing Sheets ns: 5,847,879

DUAL WAVELENGTH WIDE ANGLE LARGE REFLECTIVE UNOBSCURED SYSTEM

BACKGROUND OF THE INVENTION

1. Field of the Invention

The present invention relates to a reflective optical system and, more particularly, to a compact all-reflective optical system to accommodate a dual color/or wavelength image system with a wide field of view and very fast optical speed that can be used for helmet-mounted applications.

2. Description of Related Art

All-reflective optical systems have been utilized in various imaging applications where chromatic aberrations, thermal behavior, size, weight, or cost restricts the use of conventional refractive lenses. Retroreflective systems with folded optical paths are frequently utilized in combination with lenses to provide telescopic optical systems.

Wide angle large reflective unobscured systems (WALRUS) capable of forming a high quality image with an extremely wide angle object field on a flat image surface are known. Such a system is illustrated in an article entitled "Easily Fabricated Wide Angle Telescope" by R. Calvin Owen, 430 SPIE, Vol. 1354, International Lens Design Conference (1990).

A relevant wide angle large reflective system having a fast optical speed can be found in U.S. Pat. No. 5,331,470 by the present inventor. Additional background references representing the work of the present inventor can also be found in U.S. Pat. No. 4,265,510, U.S. Pat. No. 4,733,955, U.S. Pat. No. 4,834,517, and U.S. Pat. No. 5,170,284.

Examples of helmet- and head-mounted display systems for commercial and military applications are known in U.S. Pat. Nos. 4,361,384, 4,878,046, 5,003,300, and U.S. Statutory Registration No. H7779.

There still exists a need in the optical field, and particularly in compact optical-electronic systems, such as helmet-mounted applications and small turret pilotage/navigational applications to provide very fast optical speeds and very wide field angles that can further accommodate a dual color or wavelength application.

OBJECTS AND SUMMARY OF THE INVENTION

The present invention provides a wide angle large reflective unobscured system utilizing a primary mirror to initially receive incident radiation, such as visible and infrared radiation. The primary mirror has a negative power and directs the incident energy to a secondary mirror of a positive power. The secondary mirror focuses the energy at an aperture stop so that a virtual entrance pupil is re-imaged at the aperture stop and a beamsplitter element, such as a Ge substrate beamsplitter can be operatively positioned at the aperture stop for reflecting a first portion of the energy, such as visible light, while transmitting a second portion of the energy, such as infrared radiation. The faces of the beamsplitter can be advantageously aspherical because of their position at the aperture stop to provide a correction of spherical aberration. The reflected first portion of energy can be focused by a first tertiary mirror onto a first viewing plane, while the transmitted second portion of energy can also be reflected from a second tertiary mirror to a second viewing plane. Each of the tertiary mirrors have a positive power and the arrangements of the mirrors are such to be on-axis in aperture, but off-axis in field.

The optical system is extremely compact, since the tertiary mirrors can be arranged to provide their viewing planes parallel to each other and thereby accommodate a detector array with the respective detector surfaces on either side and in alignment with the viewing plane of the respective tertiary mirrors. A thermal/electric cooler can be sandwiched by the detector surfaces to reduce any dark current generated within each array. As one example, a field of view of such an optical system can be 30 degrees elevation by 40 degrees azimuth with an optical speed of F/4.5 in elevation and F/1.5 in azimuth. The geometrical 80% blur diameters of the design can average about 0.0008 inches over the field with the best blur being 0.00035 inch and the worst blur being 0.0016 inch.

The reflective optics system of the present invention can be combined with a display system for portable application to a user, e.g., mounted on a helmet or other head supported structure to provide not only an infrared image to a soldier but also enhanced night vision by capturing photon energy in the near-visible spectrum that would not be seen by the naked eye.

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a dual wavelength wide angle large reflective unobscured system.

Figure 1:
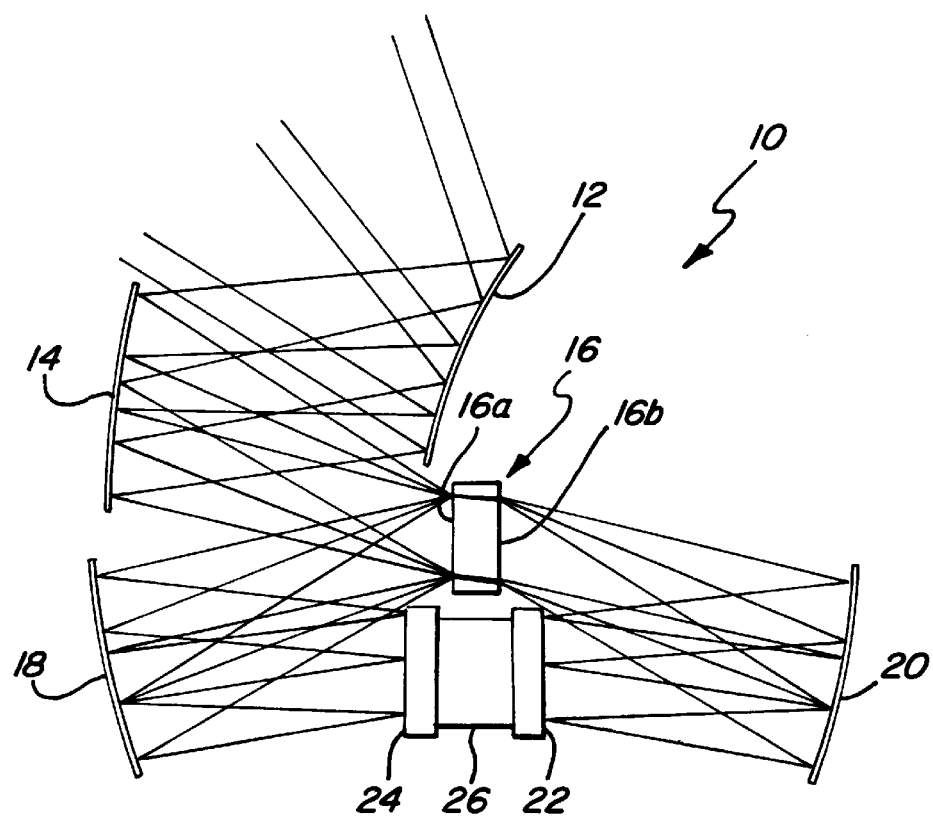
FIG. 1 is a schematic elevational ray trace view of one example of an optical system applied with a detector array.
Figure 3:
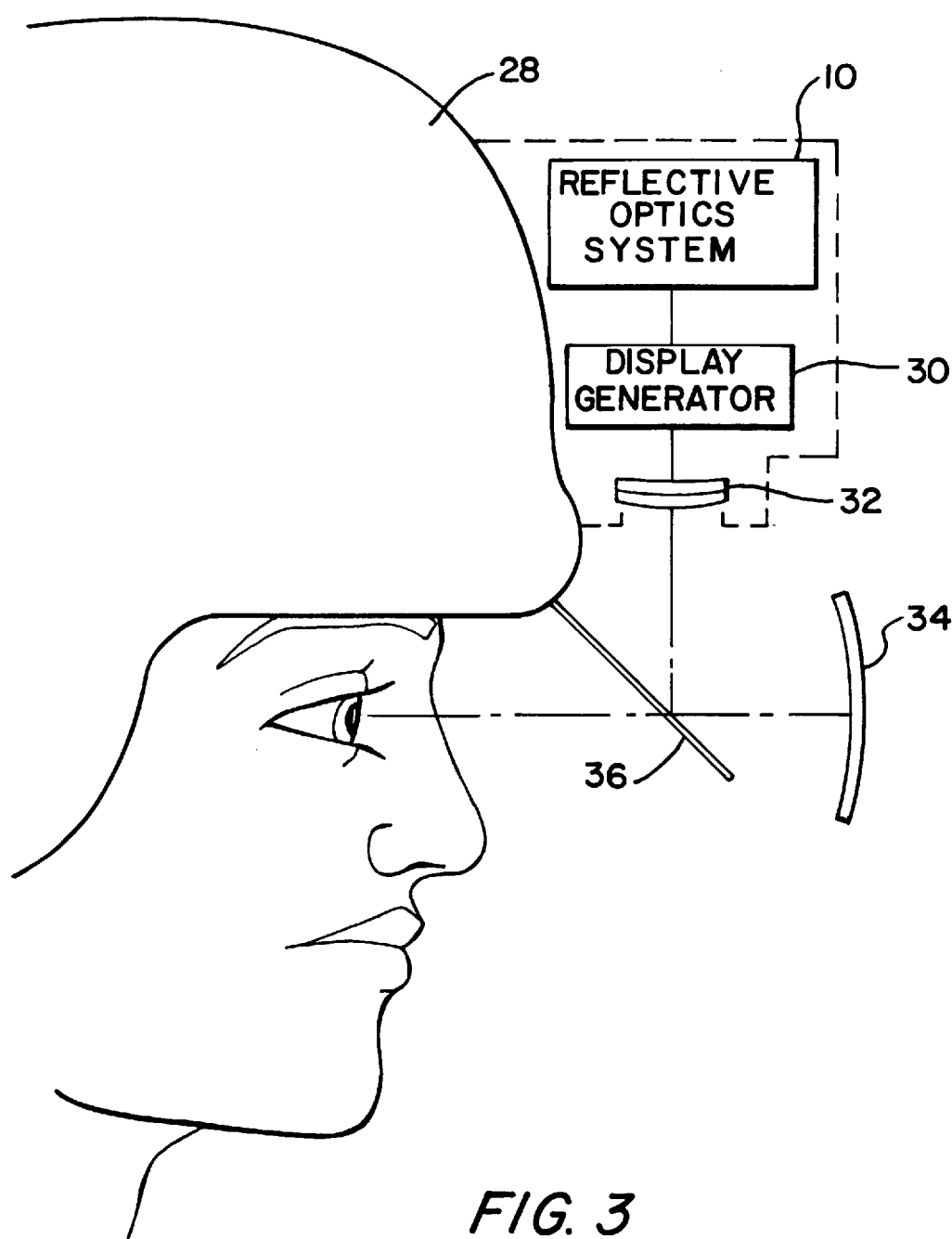
FIG. 3 is a schematic view of the reflective optics applied to a helmet-mounted application.

Referring to FIG. 1, a schematic of one application of a compact all-reflective optical system with a wide field of view and very fast optical speed, including a beamsplitter and detector array, is illustrated in a schematical manner for ease of understanding and designated with the reference number 10. The optical system 10 includes a primary mirror of a negative power 12 that will reflect a range of optical energy desired for utilization by a detector array. For example, helmet-mounted applications and small turret pilotage/navigation applications frequently require the capability of both visible and IR imaging. Detector arrays, such as a staring array, and particularly ambient temperature arrays in the IR range, such as dual color/wavelength sensors have become smaller, simpler, and less expensive. Our optical system 10 discloses a compact arrangement of both a visual and IR detector system and the primary mirror 12 is designed to have a reflective surface that is applicable over this desired wavelength range. Optical system 10 could be utilized, for example, in a helmet-mounted sensor for foot soldier use, as shown schematically in FIG. 3, a small turret pilotage/navigation sensor for aircraft and a weapon-mounted sight for alignment on a target, including that of a rifle. Each of these applications can provide a visible imagery using a CCD array 24 and night sight imagery or LWIR imagery using an ambient temperature silicon microbolometer array 22.

The primary mirror surface can be a higher order aspheric surface and will direct the desired energy to a positive powered secondary mirror 14 which can also utilize a higher order aspheric surface configuration. By using an all-reflective optical system, the present design is capable of the desired and necessary wavelength coverage, fields of view, and optical speeds. A dichroic beamsplitter, such as a Ge substrate beamsplitter 16, is located at the aperture stop where the entrance pupil of the primary mirror is realized through the optics. In this embodiment of the invention, the dichroic beamsplitter element 16 reflects visible wavelength energy to a first positive power tertiary mirror 18, while transmitting the infrared energy through the beamsplitter 16 to a second positive power tertiary mirror 20. By positioning a relative thick dichroic beamsplitter 16 at the aperture stop in a nearly collimated region midway between the secondary and the respective tertiary mirrors, a very compact arrangement can be provided. The respective tertiary mirrors 18 and 20 can focus the respective visible light and infrared light onto a pair of parallel image planes. The positions of the image planes can be varied during the optical design process by varying the thickness of the beamsplitter substrate 16. As with the primary mirror 12 and secondary mirror 14, the respective tertiary mirror surfaces 18 and 20 can have an aspherical configuration to address aberrations, such as spherical, coma, and astigmatic aberrations.

The front and back surfaces of the beamsplitter substrate 16 can be also be used for the correction of spherical aberration by providing an aspherical configuration. For example, the beamsplitter surface can be subject to a diamond turned lathe process to provide the appropriate aspherics. Since the beamsplitter surfaces have a unique location adjacent the aperture stop of the optical system in a nearly collimated region of the optical rays, the provision of an aspherical surface at both the entrance and exit surfaces of the beamsplitter 16 are particularly advantageous. As can be particularly appreciated, the exit surface of the beamsplitter can be particularly utilized to the address the longer wavelength radiation of the infrared spectrum. The exit surface 16b of the beamsplitter 16, in correlation with the aspherical design of the reflective surface of the second tertiary mirror 20, can ensure an adequate control of aberrations, to thereby improve the image at a focal plane common with the second detector surface, for example, of an ambient temperature silicon microbolometer array 22. Likewise, the reflective configuration of the entrance surface 16a of the beamsplitter 16 for reflecting the light to the first tertiary mirror 18 can also be advantageously designed with an aspheric surface complementary to the aspheric surface of the first tertiary mirror 18 to, again, provide an improved imagery at a focal plane common to the detector surface of the detector array 24, such as a CCD array. The CCD array with its broad wavelength sensitivity can act to enhance night vision.

To improve the performances of the respective CCD array 24 and the silicon microbolometer array 22, a common thermal electric cooler unit 26 can be sandwiched between the respective detector arrays to reduce any dark current generated within each array.

Figure 2:
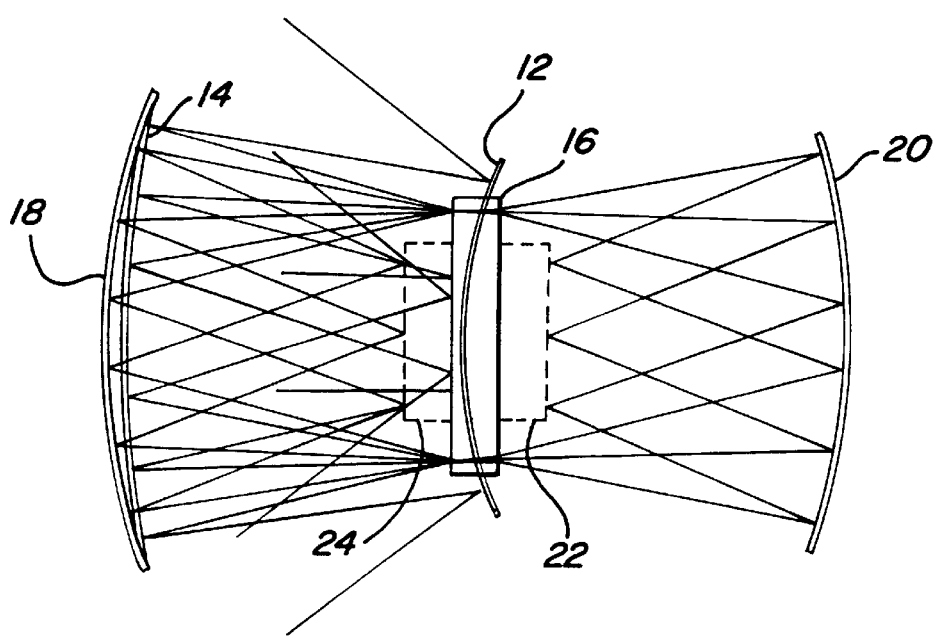
FIG. 2 is an azimuth ray trace section with a detector unit in phantom lines.

As a result of this design, an extremely fast and compact optical system is provided wherein the field of view of the optical systems is 40 degrees elevation by 53 degrees azimuth. The optical speed is F/4.5 in elevation, and F/1.5 in azimuth. The area equivalent F number will be F/2.3. The geometric 80% blur diameters of the design, shown in FIGS. 1 and 2, can average about 0.0008 inch over the field of view, with the best blur being 0.00035 inch, and the worst blur being 0.0016 inch.

The detector arrays 22 and 24 can also include entrance windows (not shown) to transmit the energy to the detector plane and to protect the detector array from contaminants. Advantageously, such windows can be manufactured from materials appropriate to the spectral bandpass of each individual detector array.

The power of the positive mirrors 14, 20, and 18 are designed to balance the negative power of the primary mirror 12 to basically provide a zero curvature or a flat field condition. The primary 12 and secondary mirrors 14 form a non-reimaging afocal telescope of the Gallilean type with an afocal magnification of about 2× of the pupil. These two mirrors relay the virtual entrance pupil (not shown), which would be located behind the primary mirror on the right side of FIG. 1, to a real aperture stop located at the beamsplitter 16. As can be appreciated, the reflective surface design of tertiary mirror 20 can take into account the transmission of the infrared spectrum through the dichroic beamsplitter 16.

Optical communication through this reflective and compact optical system permits an increase in the optical speed while providing to the user a large non-circular aperture for viewing the wide field of view.

One example of the optical system of the present invention can be found in the following:

TABLE

| No. | Element | RD | CC | AD | AE | AF | AG | THK | Matl |
|---|---|---|---|---|---|---|---|---|---|
| 12 | Primary mirror | 1.723 | −0.14348 | −0.18866 × $10^{-1}$ | −0.64627 × $10^{-2}$ | −0.47399 × $10^{-3}$ | −0.16639 × $10^{-3}$ | −1.315 | REFL |
| 14 | Secondary mirror | 4.044 | −0.77170 | −0.37004 × $10^{-2}$ | −0.34845 × $10^{-3}$ | 0.34859 × $10^{-4}$ | −0.91481 × $10^{-5}$ | 1.460 | REFL |
| 16a | Beamsplitter/ aperture stop | ∞ | 0 | 0.44574 × $10^{-3}$ | 0.31835 × $10^{-2}$ | −0.25449 × $10^{-1}$ | 0.54572 × $10^{-1}$ | −1.531 | REFL |
| 18 | First tertiary mirror | 2.814 | 0.47014 | −0.26124 × $10^{-2}$ | 0.20758 × $10^{-3}$ | −0.15947 × $10^{-2}$ | 0.44579 × $10^{-3}$ | 1.334 | REFL |
| 24 | First focal plane | ∞ | — | — | — | — | — | — | — |
| 16a | Beam- | ∞ | 0 | 0.44574 × $10^{-3}$ | 0.31835 × $10^{-2}$ | −0.25449 × $10^{-1}$ | 0.54572 × $10^{-1}$ | 0.20 | GE |

TABLE-continued

| No. | Element | RD | CC | AD | AE | AF | AG | THK | Matl |
|---|---|---|---|---|---|---|---|---|---|
|  | splitter aperture stop |  |  |  |  |  |  |  |  |
| 16b | Beam-splitter | ∞ | 0 | $0.82506 \times 10^{-4}$ | $0.89348 \times 10^{-2}$ | $-0.53581 \times 10^{-1}$ | 0.10602 | 1.5235 | AIR |
| 20 | Second tertiary mirror | −2.806 | 0.41520 | $0.22562 \times 10^{-2}$ | $-0.16526 \times 10^{-3}$ | $0.13431 \times 10^{-2}$ | $-0.31664 \times 10^{-3}$ | −1.329 | REFL |
| 22 | Second focal plane | ∞ | — | — | — | — | — | — | — |

Field of view: 40° elevation × 53° azimuth
Aperture stop size: 0.36 elevation × 1.08 azimuth, racetrack
Focal length: 0.589 paraxial
Field offset: 52° to FOV center
Nominal spectral bands: Visible and 8–12 microns One example of an application of the reflective optics system of the present invention is shown schematically in FIG. 3. A helmet 28 can mount the optical system 10 within an appropriate housing, including a source of power (not shown). Alternatively, goggles or other head-mounted support members can be used instead of a helmet. The detector arrays 24 and 22 can drive a display generator 30 with a display, such as an LCD, which can be projected and focused by projection optics 32 onto a beamsplitter 32 to be further reflected and realized as a virtual image on a partially reflective combining mirror surface 34 to allow the user to view both reflected images and the transmitted outside real world scene.

As can be appreciated, variations can be made in the present invention within the skill of a person in the optical field. Anti-reflective coatings can be utilized and tailored to the particular effective range of radiation impacting on a surface. As noted, all wavelengths of the light will share the common primary mirror 12 and secondary mirror 14. The visible light will be reflected from the first surface of the beamsplitter 16 and while a Ge substrate beamsplitter is contemplated, it can be readily appreciated that other forms of beamsplitters are known and can be used in this field. A simple reference to any computerized optical data base under the definition of beamsplitter in the optical field will provide to a person of ordinary skill in this field, numerous examples of different beamsplitters along with their optical characteristics. The visible light reflected from the beamsplitter 16 is focused by the tertiary mirror 18, while the LWIR energy will pass through the beamsplitter will be focused by the tertiary mirror 20. Again, different forms of visible and LWIR focal plane detector arrays can be utilized and can also be ascertained by a person of ordinary skill in the field by reference to an appropriate search data base under semiconductor detector arrays.

While the present invention has been designed specifically to address helmet-mounted small turret pilotage/navigation aircraft sensors and weapon sight sensors, it can be appreciated that other applications of the present invention can be readily determined, wherever there is a desire to have a relatively inexpensive compact wide angle fast optical system. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A wide angle large reflective unobscured system comprising:
    a primary reflective element adapted to receive energy;
    a secondary reflective element for receiving energy reflected from said primary reflective element, said primary and secondary reflective elements cooperating to reimage a virtual entrance pupil to a real aperture stop;
    a pair of tertiary reflective elements; and
    a beamsplitter element for reflecting a first portion of the energy to one tertiary reflector and for transmitting a second portion of energy to the other tertiary reflector.

2. The wide angle large reflective unobscured system as set forth in claim 1, wherein said beamsplitter element is positioned at the aperture stop of the system.

3. The wide angle large reflective unobscured system as set forth in claim 1, having a field of view of about 40 degrees of elevation by 53 degrees azimuth.

4. The wide angle large reflective unobscured system as set forth in claim 1 wherein the area equivalent optical speed is about F/2.3.

5. The wide angle large reflective unobscured system as set forth in claim 1 further including a detector array assembly for receiving respective first and second portions of energy from the pair of tertiary reflectors.

6. The wide angle large reflective unobscured system as set forth in claim 5 wherein the detector array assembly includes a first detector having a first detector surface for receiving a first portion of energy and a second detector having a second detector surface for receiving a second portion of energy, the respective detector surfaces are in planes parallel to each other.

7. The wide angle large reflective unobscured system as set forth in claim 6 wherein the first and second detector surfaces face away from each other.

8. The wide angle large reflective unobscured system as set forth in claim 5, further including a thermo-electric cooler unit connected to the detector array assembly.

9. A wide angle reflective unobscured system comprising:
    a primary mirror positioned to receive and reflect energy from a scene to be viewed;
    a secondary mirror positioned to receive energy from said primary mirror, said primary and secondary mirrors forming a real image of a virtual entrance pupil at an aperture stop;
    a pair of tertiary mirrors positioned to receive energy from said secondary mirror and reflecting and focusing energy to a viewing position;

a beamsplitter element, positioned at an aperture stop for reflecting energy to one tertiary mirror and for transmitting through the beamsplitter element energy to the other tertiary mirror; and a detector array assembly at the viewing position for receiving the energy from each tertiary mirror.

10. The wide angle large reflective unobscured system as set forth in claim 9 further including a cooler unit connected to the detector array assembly.

11. The wide angle large reflective unobscured system as set forth in claim 9 wherein the beamsplitter element can reflect a visible range of light energy and transmit infrared light energy.

12. The wide angle large reflective unobscured system as set forth in claim 11 wherein the beamsplitter element has an aspherical surface to aid in correcting aberrations.

13. The wide angle large reflective unobscured system as set forth in claim 12 wherein the beamsplitter element has a pair of aspherical surfaces.

14. The wide angle large reflective unobscured system as set forth in claim 9 wherein said primary mirror is a negative power mirror.

15. The wide angle large reflective unobscured system as set forth in claim 9 wherein said secondary mirror is a positive power mirror.

16. The wide angle large reflective unobscured system as set forth in claim 9 wherein said tertiary mirrors are positive power mirrors.

17. An optical detection system comprising:

a primary mirror;

a secondary mirror in optical communication with said primary mirror;

an aspherical beamsplitter element in optical communication with the secondary mirror;

a pair of tertiary mirrors in optical communication with the beamsplitter element; and a detector unit in optical communication with at least one tertiary mirror.

18. The optical detection system of claim 17 wherein the detector unit is adapted to receive infrared energy.

19. The optical detection system of claim 17 wherein said mirrors and beamsplitter element are positioned on-axis in aperture and off-axis in field.

20. The optical detection system of claim 17 further including a pair of detector surfaces on the detector unit, and a cooler unit sandwiched by the respective detector surfaces, one of the tertiary mirrors provides optical communications to one detector surface while the other tertiary mirror provides optical communications to the other detector surface.

21. An improved head-mounted viewing system comprising:

a support member adapted to be mounted on the head of a user;

a reflective optics system supported on the support member, including, a primary element adapted to receive energy;

a secondary reflective element for receiving energy reflected from said primary reflective element, said primary and secondary reflective elements cooperating to reimage a virtual entrance pupil to a real aperture stop;

a pair of tertiary reflective elements; and a beamsplitter element for reflecting a first portion of the energy to one tertiary reflector element and for transmitting a second portion of energy to the other tertiary reflector element;

a first detector unit for receiving a first portion of energy from one tertiary reflector element supported on the support member;

a second detector unit for receiving a second portion of energy from the other tertiary reflector element supported on the support member; and a display unit supported on the support member and connected to the first and second detector units for displaying the detected portions of energy to the user.

* * * * *